(12) United States Patent
Tang

(10) Patent No.: US 11,817,134 B2
(45) Date of Patent: *Nov. 14, 2023

(54) MAGNETIC RECORDING HEAD AND MAGNETIC DISK DRIVE

(71) Applicant: TDK CORPORATION, Tokyo (JP)

(72) Inventor: Zhenyao Tang, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,449

(22) Filed: Aug. 24, 2022

(65) Prior Publication Data

US 2023/0125878 A1 Apr. 27, 2023

Related U.S. Application Data

(63) Continuation-in-part of application No. 17/509,834, filed on Oct. 25, 2021, now Pat. No. 11,636,874.

(51) Int. Cl.
*G11B 5/11* (2006.01)

(52) U.S. Cl.
CPC ........................................ *G11B 5/11* (2013.01)

(58) Field of Classification Search
None
See application file for complete search history.

(56) References Cited

U.S. PATENT DOCUMENTS

| | | |
|---|---|---|
| 6,011,664 A | 1/2000 | Kryder et al. |
| 8,320,080 B1 | 11/2012 | Braganca et al. |
| 8,379,352 B1 * | 2/2013 | Braganca ........... G01R 33/1284 365/171 |
| 8,582,240 B1 | 11/2013 | Chen et al. |
| 10,714,127 B1 | 7/2020 | Chen et al. |
| 10,714,132 B1 | 7/2020 | Chen et al. |
| 10,748,562 B1 | 8/2020 | Chen |
| 10,770,104 B1 | 9/2020 | Chen et al. |
| 11,043,234 B2 | 6/2021 | Wu |
| 11,189,304 B2 | 11/2021 | Wu |
| 2008/0268291 A1 | 10/2008 | Akiyama et al. |
| 2009/0080105 A1 * | 3/2009 | Takashita ................ G11B 5/314 360/75 |
| 2009/0080106 A1 * | 3/2009 | Shimizu .................. G11B 5/314 360/75 |
| 2013/0057983 A1 * | 3/2013 | Tanabe .................. G11B 5/3146 360/110 |
| 2013/0120875 A1 * | 5/2013 | Suto ....................... H01F 10/329 360/123.01 |

(Continued)

OTHER PUBLICATIONS

Masayuki Takagishi et al., Design Concept of MAS Effect Dominant MAMR Head and Numerical Study, IEEE Transactions on Magnetics, vol. 57, No. 3, Mar. 2021.

(Continued)

*Primary Examiner* — William J Klimowicz
(74) *Attorney, Agent, or Firm* — Oliff PLC

(57) ABSTRACT

This magnetic recording head includes a main magnetic pole, a write shield, and an element. The element has a first portion, a second portion, and a non-magnetic conductive layer disposed therebetween. The element has a first current path connecting the main magnetic pole and the non-magnetic conductive layer to each other, and a second current path connecting the write shield and the non-magnetic conductive layer to each other.

16 Claims, 11 Drawing Sheets

(56) References Cited

U.S. PATENT DOCUMENTS

| | | | |
|---|---|---|---|
| 2016/0180867 A1* | 6/2016 | Takagishi | G11B 5/09 360/123.01 |
| 2017/0236537 A1 | 8/2017 | Murakami et al. | |
| 2020/0294537 A1 | 9/2020 | Nagasawa et al. | |
| 2021/0056987 A1 | 2/2021 | Wu | |
| 2021/0375308 A1* | 12/2021 | Nagasawa | G11B 5/235 |

OTHER PUBLICATIONS

Jian-Gang Zhu et al., Microwave Assisted Magnetic Recording, IEEE Transactions on Magnetics, vol. 44, No. 1, Jan. 2008.
Jun. 24, 2022 Office Action Issued in U.S. Appl. No. 17/509,834.

* cited by examiner

MAGNETIC RECORDING HEAD AND MAGNETIC DISK DRIVE

BACKGROUND

The present invention relates to a magnetic recording head and a magnetic disk drive.

Magnetic disk drives are required to have a high recording density. Regarding one of methods for realizing a high recording density, there is microwave-assisted magnetic recording (MAMR) for assisting with magnetic recording with microwaves. For example, US2021/0056987 describes a microwave-assisted-type magnetic recording head.

SUMMARY

This magnetic recording head has a main magnetic pole, a write shield, and an element. The main magnetic pole extends toward an air bearing surface and generates a recording magnetic field. The write shield disposed on a lateral side of the main magnetic pole when viewed from the air bearing surface. The element is disposed in a gap between the main magnetic pole and the write shield. The element has a first portion, a second portion, and a non-magnetic conductive layer disposed between the first portion and the second portion. The first portion is disposed between the main magnetic pole and the non-magnetic conductive layer. The first portion includes a first ferromagnetic layer and a first non-magnetic layer. The first non-magnetic layer is disposed between the first ferromagnetic layer and the main magnetic pole. The second portion is disposed between the write shield and the non-magnetic conductive layer. The second portion includes a second ferromagnetic layer and a second non-magnetic layer. The second non-magnetic layer is disposed between the second ferromagnetic layer and the write shield. The element has a first current path connecting the main magnetic pole and the non-magnetic conductive layer to each other, and a second current path connecting the write shield and the non-magnetic conductive layer to each other. This magnetic recording head can stably oscillate microwaves.

DETAILED DESCRIPTION

Figure 1:
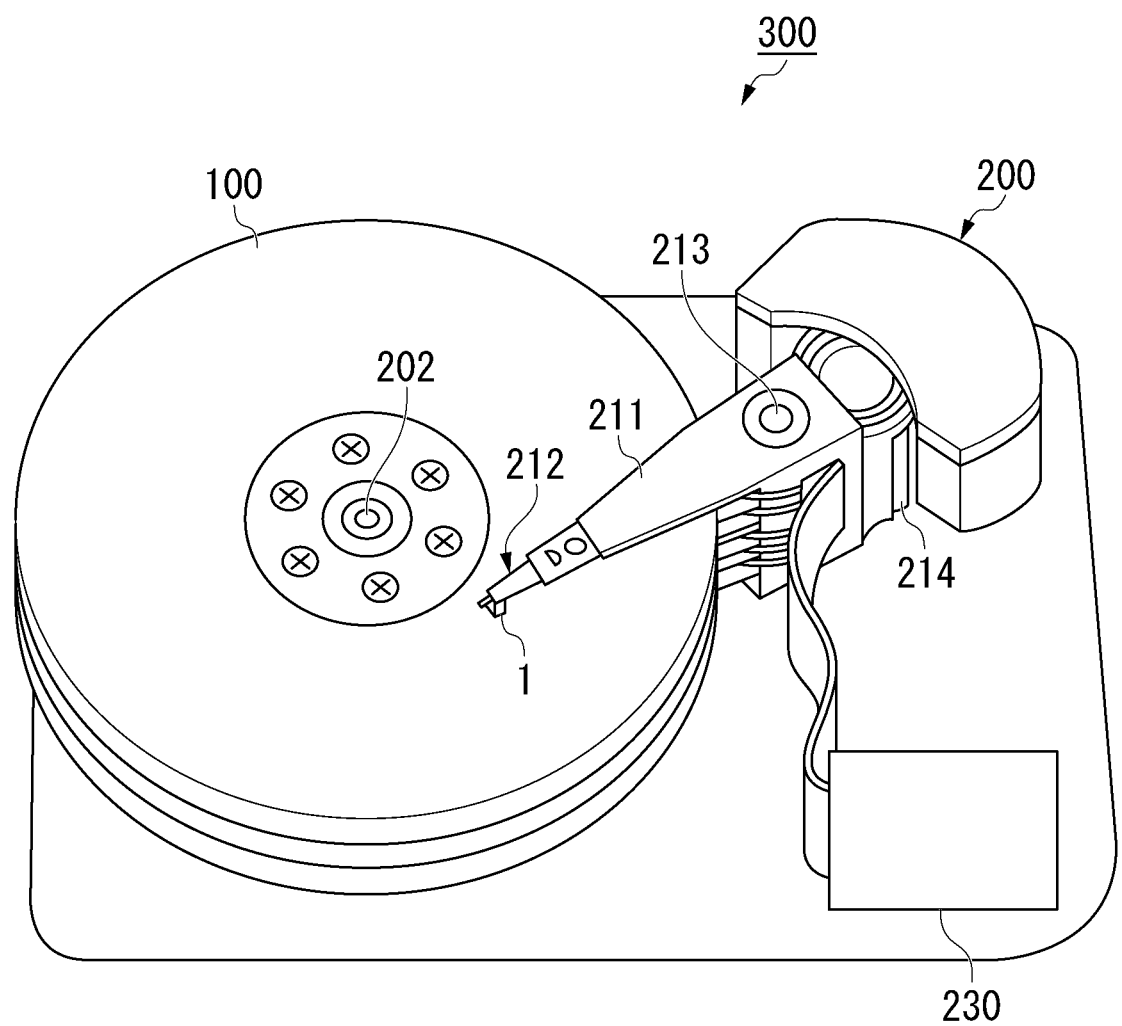
FIG. 1 is a schematic view of a magnetic disk drive according to a first embodiment.

Hereinafter, the present embodiment will be described in detail suitably with reference to the drawings. In the drawings used in the following description, in order to make characteristics easy to understand, characteristic parts may be illustrated in an enlarged manner for the sake of convenience, and dimensional ratios or the like of each constituent element may differ from actual values thereof. Materials, dimensions, and the like illustrated in the following description are merely exemplary examples. The present invention is not limited thereto and can be suitably changed and performed within a range in which the effects of the present invention are exhibited.

First Embodiment

FIG. 1 is a perspective view of a magnetic disk drive 300. The magnetic disk drive 300 includes magnetic recording media 100 and a carriage assembly device 200.

For example, the magnetic recording media 100 are magnetic disks. A plurality of magnetic recording media 100 are installed in the carriage assembly device 200. Data is recorded in the magnetic recording media 100. For example, the magnetic recording media 100 are perpendicular magnetic recording media. For example, each of the magnetic recording media 100 includes a soft magnetic underlayer, an intermediate layer, and a magnetic recording layer on a non-magnetic substrate. The magnetic recording media 100 can be installed in a spindle motor 202 of the carriage assembly device 200 and rotate about a shaft of the spindle motor 202.

The carriage assembly device 200 includes the spindle motor 202, drive arms 211, head gimbal assemblies (HGAs) 212, a bearing shaft 213, a voice coil motor (VCM) 214, and a control device 230. The carriage assembly device 200 controls the position of a magnetic recording head 1 with respect to the magnetic recording media 100.

The spindle motor 202 rotates the magnetic recording media 100. The drive arms 211 are stacked along the bearing shaft 213. The voice coil motor 214 allows each of the drive arms 211 to perform angle swinging about the bearing shaft 213. The head gimbal assemblies 212 are installed at tips of the drive arms 211. The magnetic recording head 1 (which will be described below) is installed in each of the head gimbal assemblies 212. The control device 230 controls writing and reading of the magnetic recording head 1.

FIG. 1 presents an example in which a plurality of magnetic recording media 100, drive arms 211, and HGAs 212 are provided, but there may be only one of each.

Figure 2:
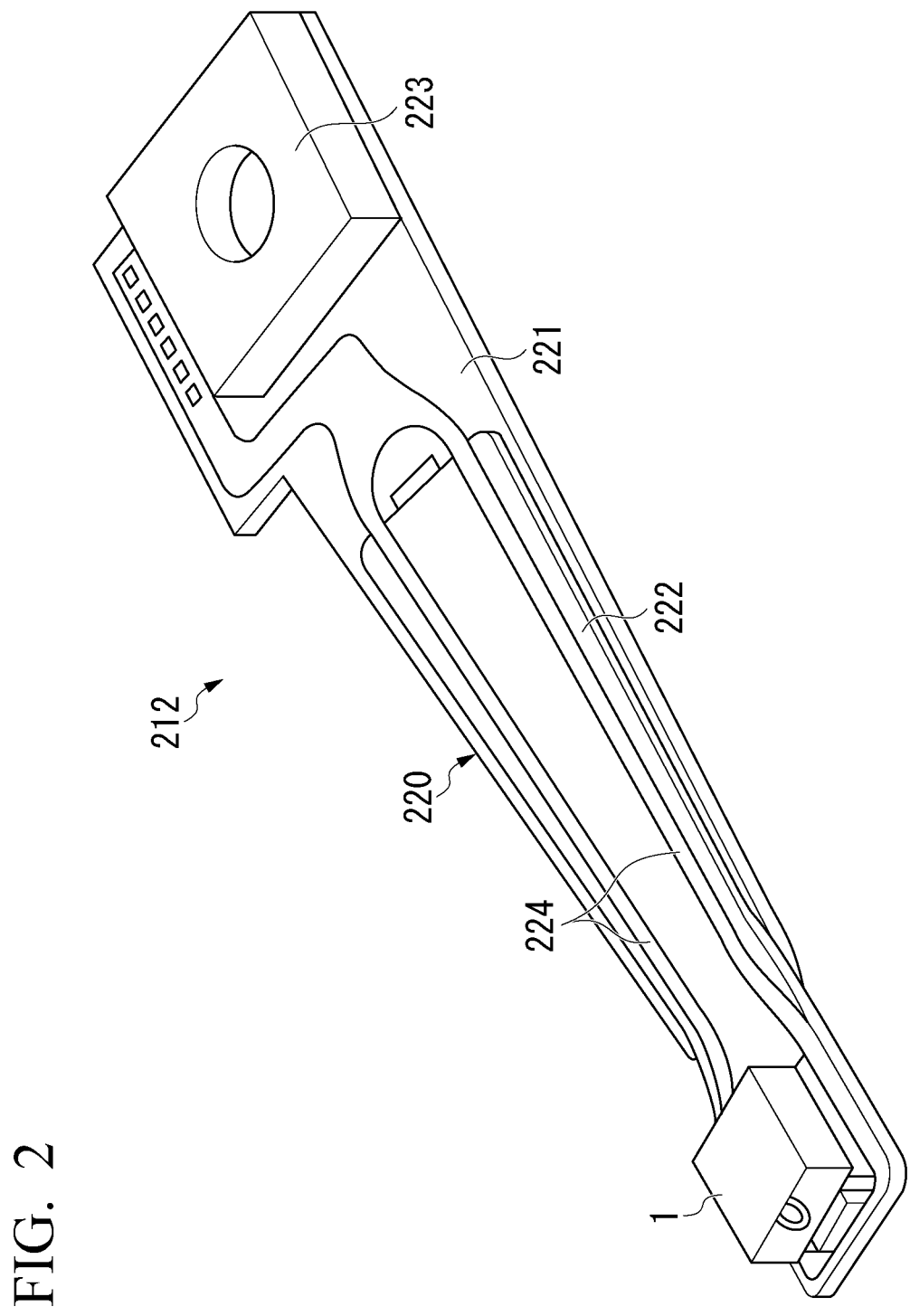
FIG. 2 is a schematic view of a head gimbal assembly of the magnetic disk drive according to the first embodiment.

FIG. 2 is a schematic view of the head gimbal assembly 212 of the magnetic disk drive according to a first embodiment. The head gimbal assembly 212 includes a suspension 220, wirings 224, and the magnetic recording head 1.

The suspension 220 includes a load beam 221, a flexure 222, and a base plate 223. The flexure 222 is fixedly attached to the load beam 221 and has elasticity. The base plate 223 is a support portion of the load beam 221.

The wirings 224 include a lead conductor on the flexure 222, and connection pads at both ends of the lead conductor.

First ends of the wirings 224 are connected to a terminal electrode of the magnetic recording head 1, and second ends thereof are connected to the control device 230.

The magnetic recording head 1 faces a surface of each magnetic recording medium 100 with a certain space therebetween. The magnetic recording head 1 is fixedly attached to a tip of the flexure 222 of the suspension 220.

Figure 3:
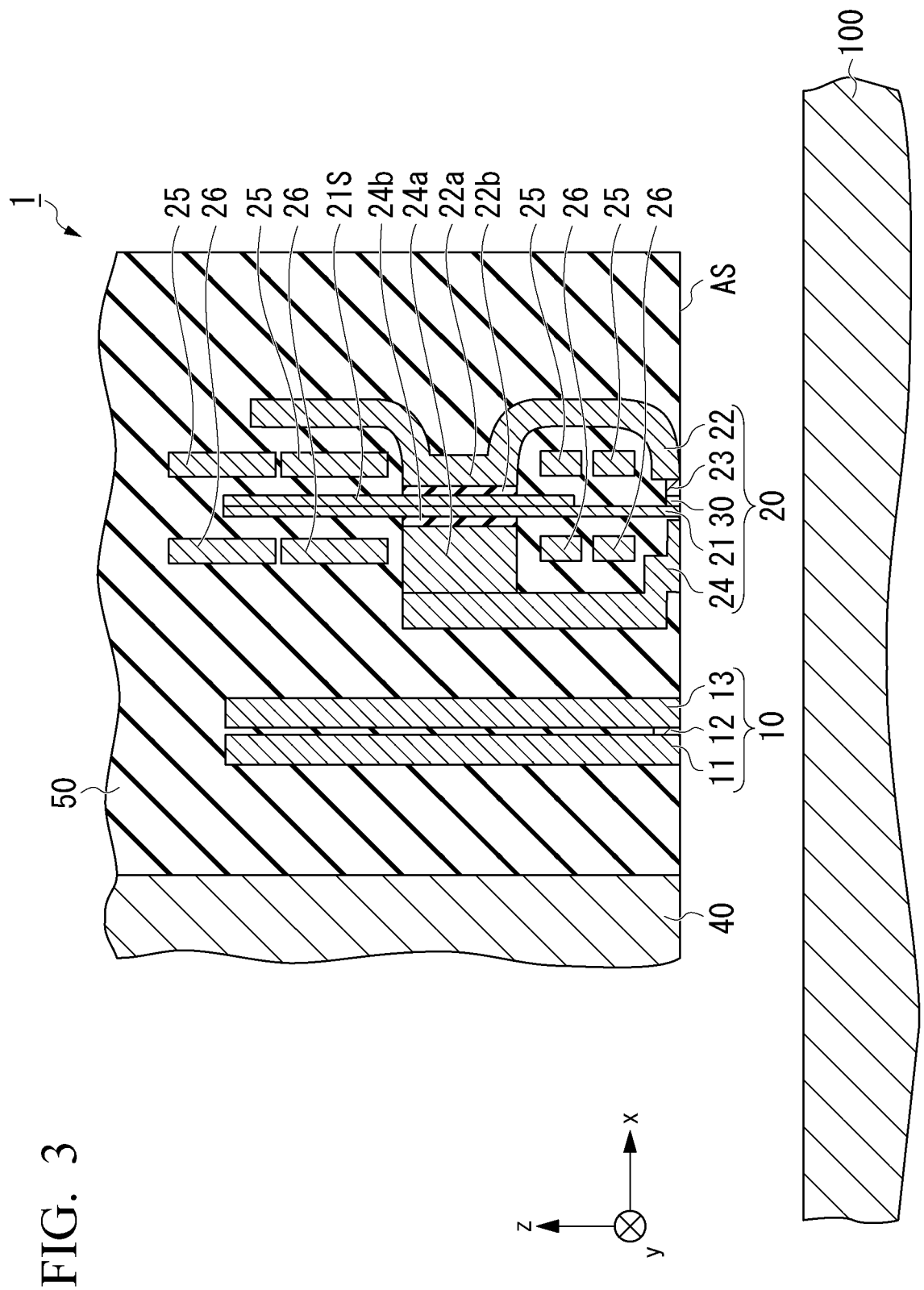
FIG. 3 is a cross-sectional view of a magnetic recording head according to the first embodiment.

FIG. 3 is a cross-sectional view of the magnetic recording head 1. The magnetic recording head 1 is disposed such that an air bearing surface AS faces the magnetic recording medium 100. The air bearing surface AS horizontally moves at a position floating from the magnetic recording medium 100 by a certain amount.

Here, directions will be defined. A plane on which the air bearing surface AS expands will be referred to as an xy plane. A direction in which the magnetic recording head 1 proceeds will be referred to as an x direction, and a direction orthogonal to the x direction will be referred to as a y direction. For example, the x direction coincides with a gap direction. In addition, a direction orthogonal to the air bearing surface AS will be referred to as a z direction. For example, the z direction coincides with a first direction.

For example, the magnetic recording head 1 has a reproduction head 10, a recording head 20, a slider substrate 40, and an insulation layer 50. The reproduction head 10 and the recording head 20 are stacked on the slider substrate 40 with the insulation layer 50 therebetween. The magnetic recording head 1 may have a protective film which protects a surface thereof facing the magnetic recording medium 100. In this case, a surface of the protective film serves as the air bearing surface AS.

A known substrate can be used as the slider substrate 40. For example, the slider substrate 40 is made of ceramic such as AlTiC. The insulation layer 50 is an interlayer insulating film. For example, the insulation layer 50 is made of silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), or the like.

The reproduction head 10 receives a recording signal from the magnetic recording medium 100. For example, the reproduction head 10 includes a lower shield 11, a magneto-resistive effect element 12, and an upper shield 13.

The magneto-resistive effect element 12 detects a signal magnetic field from the magnetic recording medium 100. The magneto-resistive effect element 12 has two ferromagnetic layers and a non-magnetic layer sandwiched therebetween. For example, the magneto-resistive effect element 12 is a current-in-plane giant magneto-resistive (CIP-GMR) element, a current-perpendicular-plane giant magneto-resistive (CPP-GMR) element, or a tunneling magneto-resistive (TMR) element.

The resistance of the magneto-resistive effect element 12 changes depending on a relative angle of magnetizations of the two ferromagnetic layers. The magneto-resistive effect element 12 converts a signal magnetic field from the magnetic recording medium 100 into an electrical signal.

The lower shield 11 and the upper shield 13 curb the influence of an external magnetic field applied to the magneto-resistive effect element 12. An external magnetic field causes noise of the magneto-resistive effect element 12.

The lower shield 11 and the upper shield 13 include a soft magnetic body. For example, the lower shield 11 and the upper shield 13 are multilayer films including NiFe (Permalloy), FeSiAl (Sendust), CoFeNi, CoFe, FeN, FeZrN, CoZrTaCr, or a magnetic body.

When the magneto-resistive effect element 12 is a CIP-GMR element or a CPP-GMR element, the lower shield 11 and the upper shield 13 may also serve as electrodes for electrifying the magneto-resistive effect element 12. When the magneto-resistive effect element 12 is a TMR element, a wiring layer which is connected to the magneto-resistive effect element 12 and insulated from the lower shield 11 and the upper shield 13 is separately provided.

The recording head 20 applies a magnetic field to the magnetic recording medium 100 and performs writing with respect to the magnetic recording medium 100. For example, the recording head 20 includes a main magnetic pole 21, a trailing shield 22, a reading shield 24, coils 25 and 26, and an oscillation element 30. The oscillation element 30 is an example of an element in the claims.

The main magnetic pole 21 extends toward the air bearing surface AS. For example, the main magnetic pole 21 extends in the z direction, and a first end thereof leads to the air bearing surface AS. The main magnetic pole 21 generates a recording magnetic field when a writing current is applied to the coils 25 and 26. A magnetic flux generated in the main magnetic pole 21 leads to the magnetic recording medium 100. The magnetic recording medium 100 is subjected to writing by a recording magnetic field from the main magnetic pole 21. The main magnetic pole 21 may include an auxiliary magnetic pole 21S. The auxiliary magnetic pole 21S comes into contact with the main magnetic pole 21 at a position separated from the air bearing surface AS in the z direction.

The main magnetic pole 21 and the auxiliary magnetic pole 21S include a soft magnetic body. For example, the main magnetic pole 21 and the auxiliary magnetic pole 21S include an iron-based alloy material having Fe as a main component. For example, the iron-based alloy material is FeNi, FeCo, FeCoNi, FeN, FeZrN, or the like.

The trailing shield 22 causes a reflux of a magnetic flux generated from the main magnetic pole 21. The trailing shield 22 is a magnetic path of a magnetic flux which has been subjected to a reflux from a soft magnetic backing layer of the magnetic recording medium 100.

For example, the trailing shield 22 includes a coupling portion 22a and a back gap 22b. The back gap 22b insulates the main magnetic pole 21 and the coupling portion 22a from each other. The coupling portion 22a returns a magnetic flux, which has been subjected to a reflux along the trailing shield 22, to the main magnetic pole 21.

For example, the trailing shield 22 includes a write shield 23. The trailing shield 22 and the write shield 23 may be integrated. The write shield 23 is a part facing the main magnetic pole 21 in the trailing shield 22. As shown in FIG. 3, the write shield 23 is a part of the trailing shield 22 which includes a tip on the air bearing surface AS side and faces a tip portion of the main magnetic pole 21 on the air bearing surface AS side. The write shield 23 is provided on a lateral side of the main magnetic pole 21 with respect to the air bearing surface AS.

The trailing shield 22 includes a soft magnetic body. For example, the trailing shield 22 is formed of a Permalloy or a material similar to that of the main magnetic pole 21.

A gap (write gap) is provided between the main magnetic pole 21 and the write shield 23. A gap direction directed from the main magnetic pole 21 toward the write shield 23 is the x direction when viewed from the z direction. The oscillation element 30 is provided in the gap. Details of the oscillation element 30 will be described below.

The reading shield 24 takes in a magnetic flux expanding from the main magnetic pole 21. For example, the reading shield 24 includes a coupling portion 24a and a back gap 24b. The reading shield 24 includes a material similar to that of the trailing shield 22.

The coils 25 and 26 are respectively wound around the coupling portions 22a and 24a and the back gaps 22b and 24b serving as center axes. The coils 25 and 26 include a highly conductive material such as Cu. When a writing current is applied to the coils 25 and 26, a recording magnetic field is generated from the main magnetic pole 21.

Figure 4:
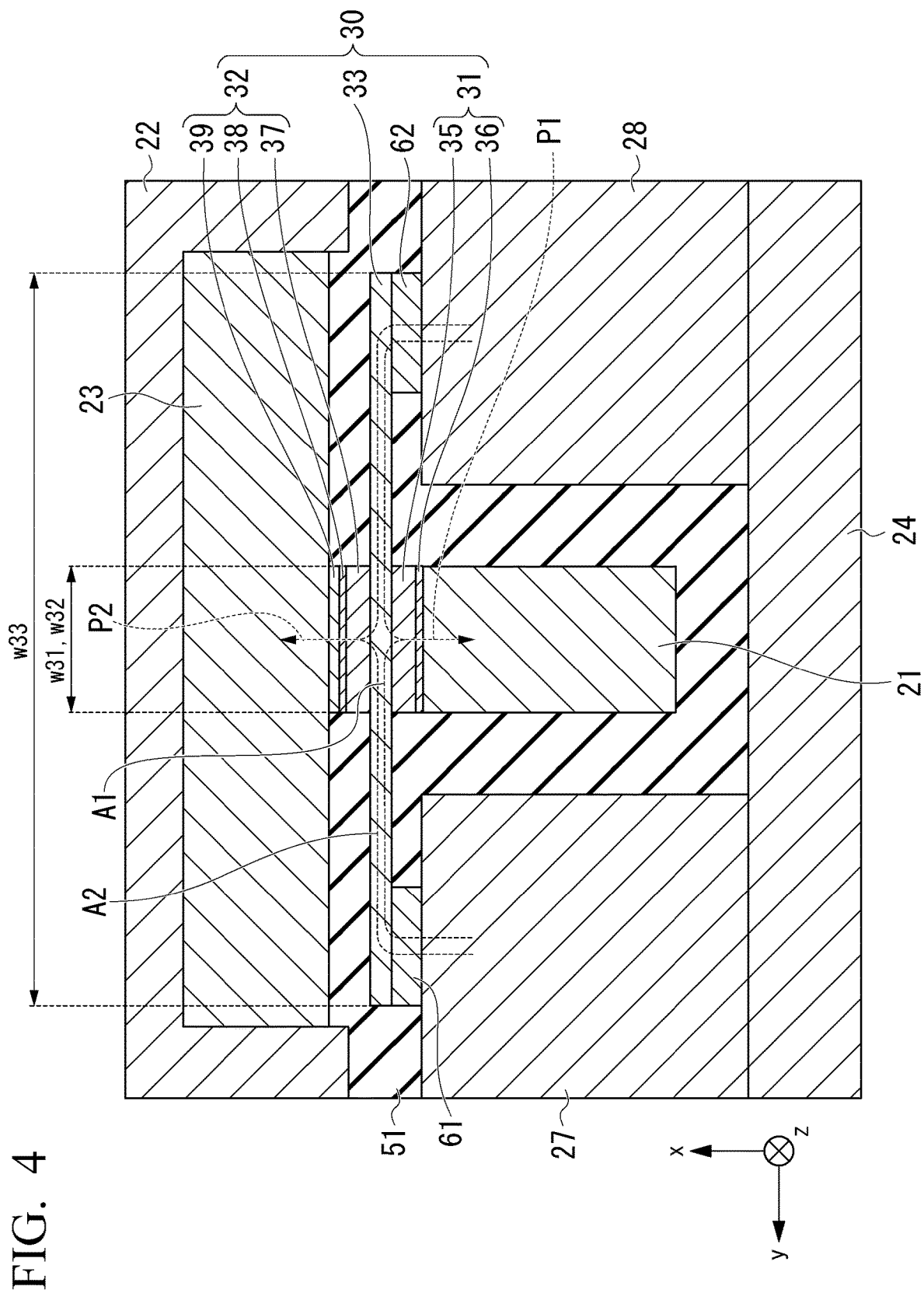
FIG. 4 is a plan view of a characteristic part of the magnetic recording head according to the first embodiment when viewed from an air bearing surface side.

FIG. 4 is a plan view of a part in the vicinity of the oscillation element 30 of the recording head 20 according to the first embodiment when viewed from the air bearing surface AS side. Side shields 27 and 28 are disposed on lateral sides of the main magnetic pole 21 when viewed from the air bearing surface AS side. As shown in FIG. 4, the side shields 27 and 28 are positioned in a direction (for example, y direction) crossing a gap direction (for example, x direction) from the main magnetic pole 21 when viewed from the air bearing surface AS side. An insulation layer 51 is provided between each of the side shields 27 and 28 and the write shield 23, and the main magnetic pole 21. For example, the insulation layer 51 insulates the trailing shield 22 and the write shield 23 from the side shields 27 and 28. As shown in FIG. 4, the write shield 23 is separated from each of the side shields 27 and 28 by the insulation layer 51 on the air bearing surface AS side. The insulation layer 51 is formed of a material similar to that of the insulation layer 50. Each of the side shields 27 and 28 is formed of a material similar to that of the trailing shield 22.

For example, a conductive layer 61 is provided between a non-magnetic conductive layer 33 of the oscillation element 30 and the side shield 27. The side shield 27 is electrically connected to the non-magnetic conductive layer 33 with the conductive layer 61 therebetween. For example, a conductive layer 62 is provided between the non-magnetic conductive layer 33 of the oscillation element 30 and the side shield 28. The side shield 28 is electrically connected to the non-magnetic conductive layer 33 with the conductive layer 62 therebetween. The conductive layers 61 and 62 include a highly conductive material such as Cu or Al.

Figure 5:
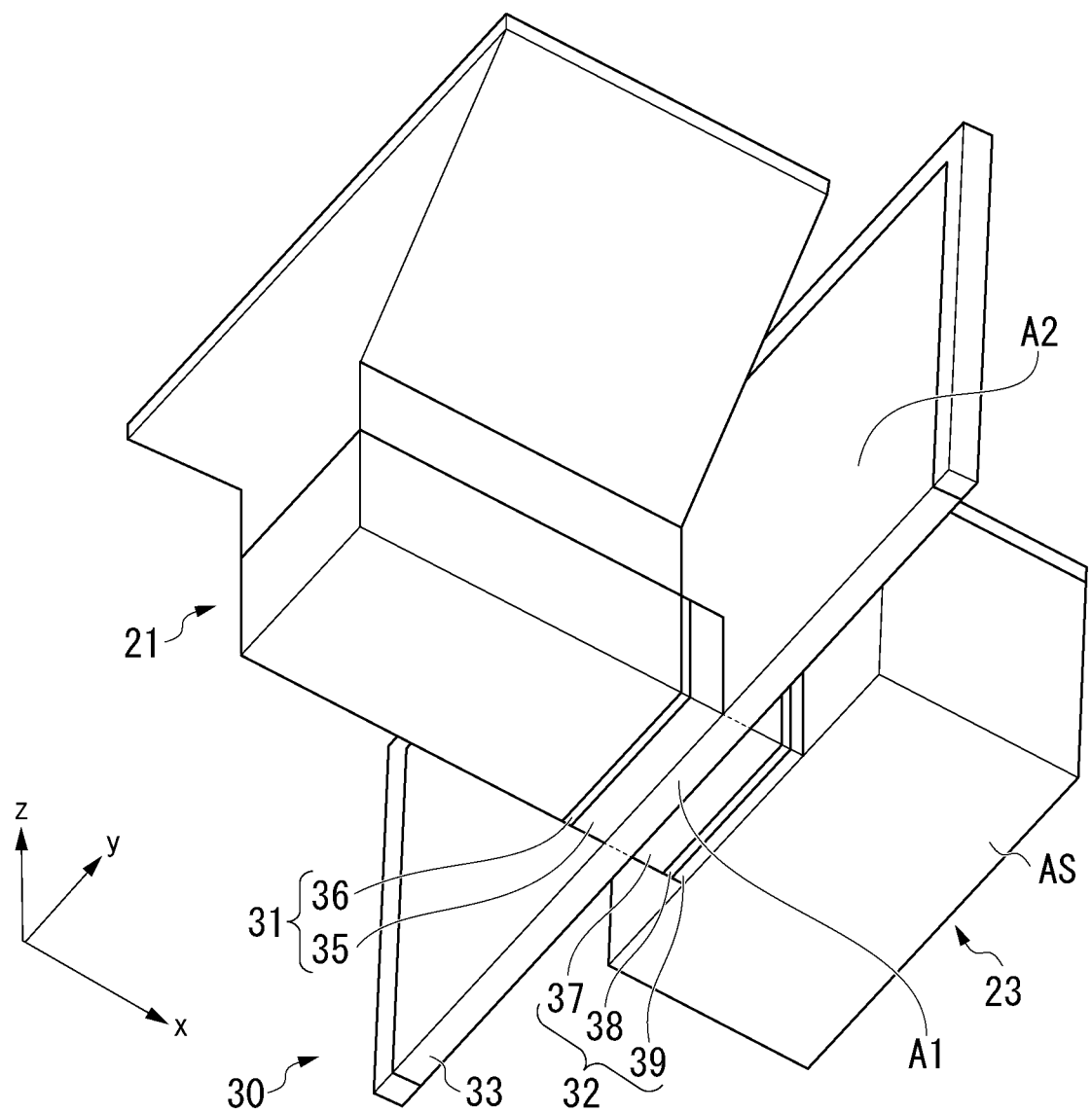
FIG. 5 is a perspective view of the characteristic part of the magnetic recording head according to the first embodiment when viewed from the air bearing surface side.
Figure 6:
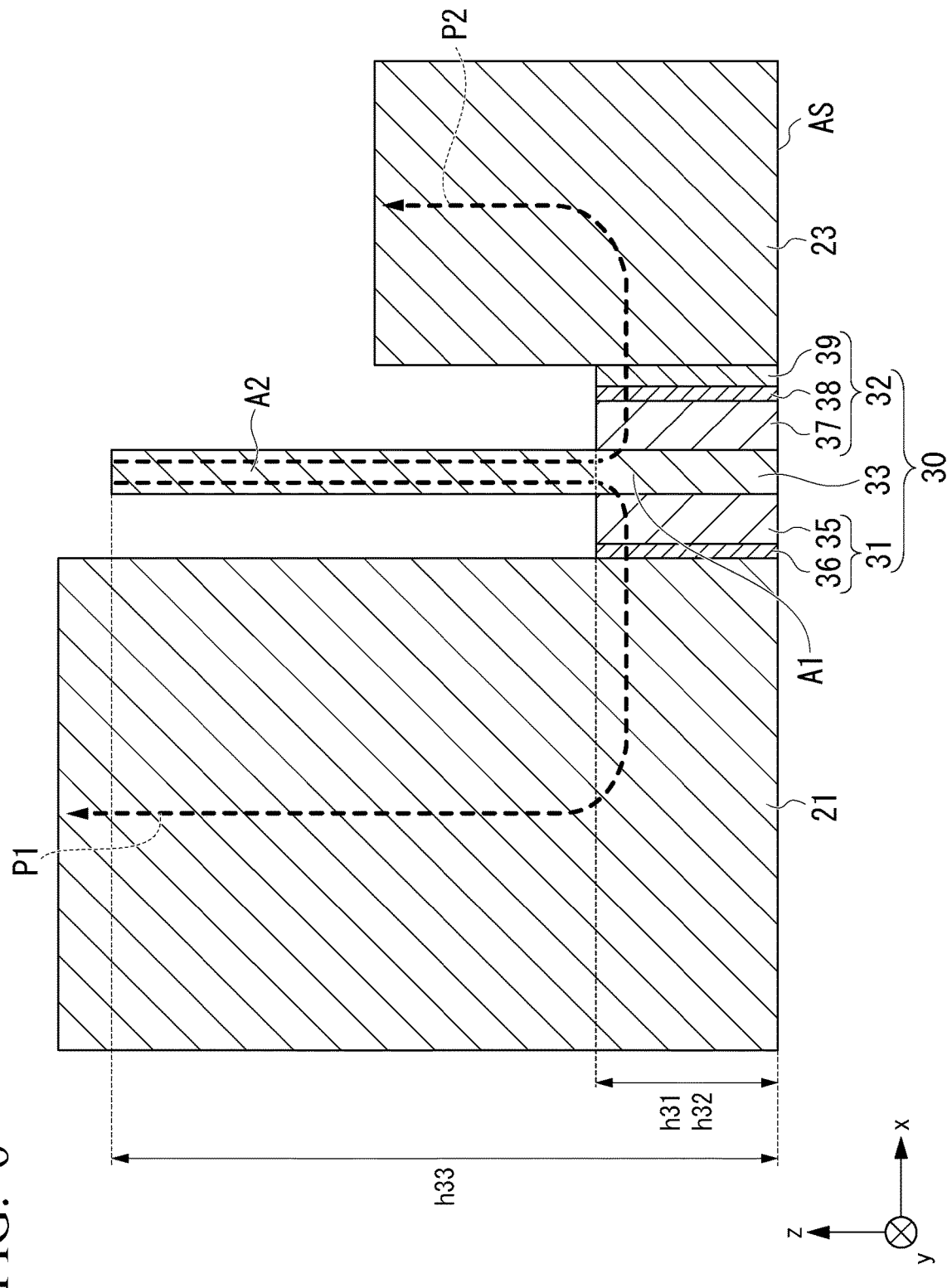
FIG. 6 is a cross-sectional view of the characteristic part of the magnetic recording head according to the first embodiment.

FIG. 5 is a perspective view of a part in the vicinity of the oscillation element 30 of the magnetic recording head 1 according to the first embodiment when viewed from the air bearing surface AS side. FIG. 6 is an xz cross section in the vicinity of the oscillation element 30 of the magnetic recording head 1 according to the first embodiment.

As described above, the oscillation element 30 is provided in the write gap between the main magnetic pole 21 and the write shield 23. The oscillation element 30 has a first oscillation portion 31, a second oscillation portion 32, and the non-magnetic conductive layer 33. The first oscillation portion 31 is an example of a first part in the claims and the second oscillation portion 32 is an example of a second part in the claims. The non-magnetic conductive layer 33 is provided between the first oscillation portion 31 and the second oscillation portion 32. The first oscillation portion 31 is provided between the main magnetic pole 21 and the non-magnetic conductive layer 33. The second oscillation portion 32 is provided between the trailing shield 22 and the non-magnetic conductive layer 33.

For example, an area of the non-magnetic conductive layer 33 is larger than an area of each of the first oscillation portion 31 and the second oscillation portion 32. An area of a surface of the non-magnetic conductive layer 33 perpendicular to a thickness direction of the non-magnetic conductive layer 33 is larger than an area of a surface of a first ferromagnetic layer 35 perpendicular to a thickness direction of the first ferromagnetic layer 35 and is larger than an area of a surface of a second ferromagnetic layer 37 perpendicular to a thickness direction of the second ferromagnetic layer 37. In the oscillation element 30 of the magnetic recording head 1 according to the first embodiment, the area is an area of a yz plane intersecting the gap direction. For example, a height h33 of the non-magnetic conductive layer 33 is larger than a height h31 of the first oscillation portion 31 and is larger than a height h32 of the second oscillation portion 32. The heights h31, h32, and h33 are heights in the z direction orthogonal to the air bearing surface AS. For example, a width w33 of the non-magnetic conductive layer 33 is larger than a width w31 of the first oscillation portion 31 and is larger than a width w32 of the second oscillation portion 32. The widths w31, w32, and w33 are widths in the y direction orthogonal to the gap direction. Since the size of the non-magnetic conductive layer 33 is larger than the sizes of the first oscillation portion 31 and the second oscillation portion 32, conduction with respect to the non-magnetic conductive layer 33 becomes easy.

Figure 7:
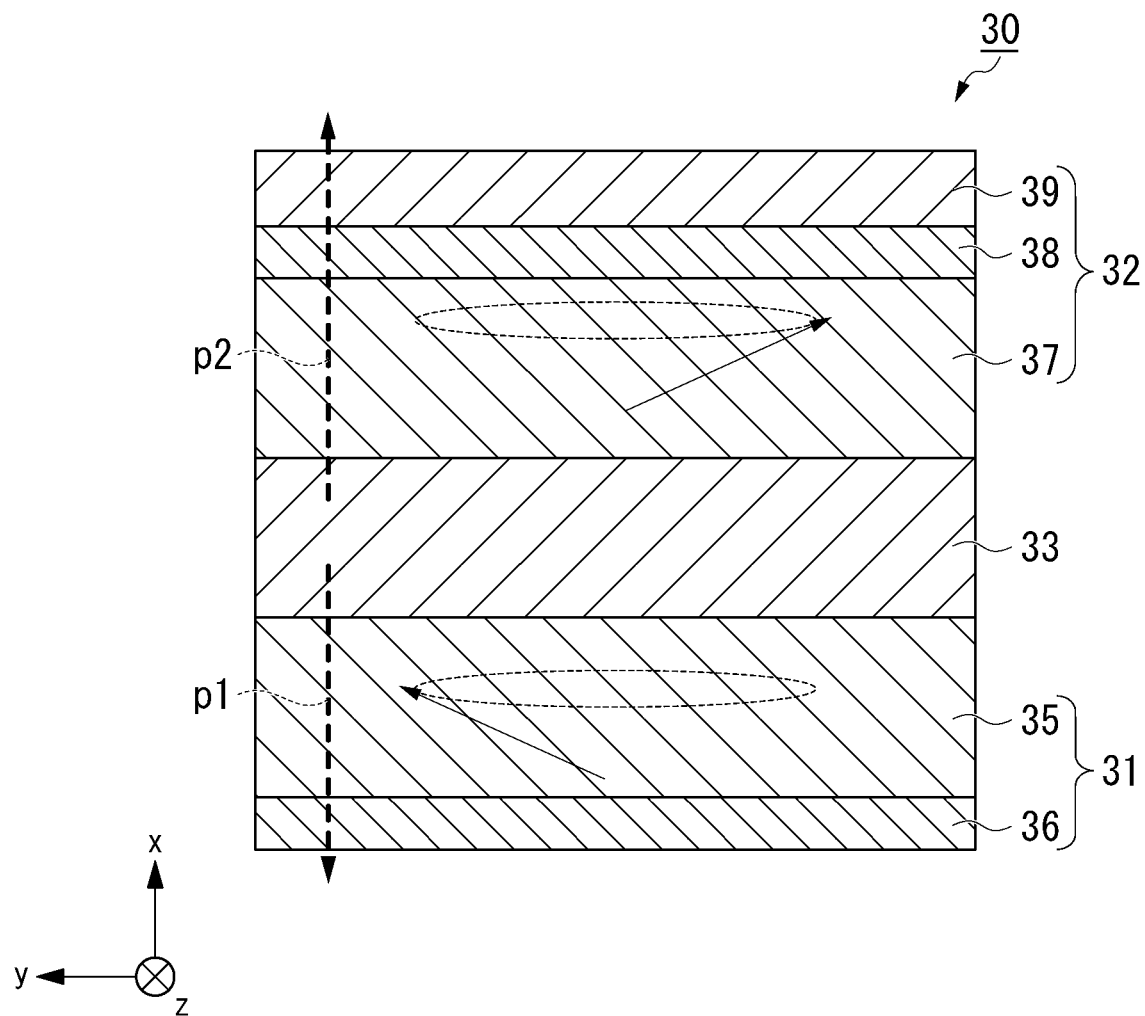
FIG. 7 is a cross-sectional view of an oscillation element according to the first embodiment.

FIG. 7 is a cross-sectional view of the oscillation element 30 according to the first embodiment. The first oscillation portion 31 has a first ferromagnetic layer 35 and a first non-magnetic layer 36. The first non-magnetic layer 36 is provided between the first ferromagnetic layer 35 and the main magnetic pole 21. The second oscillation portion 32 has a second ferromagnetic layer 37, a second non-magnetic layer 38, and a third ferromagnetic layer 39. The second non-magnetic layer 38 is provided between the second ferromagnetic layer 37 and the write shield 23. The third ferromagnetic layer 39 is provided between the second non-magnetic layer 38 and the write shield 23. The third ferromagnetic layer 39 may be integrated with the write shield 23.

Each of the first ferromagnetic layer 35, the second ferromagnetic layer 37, and the third ferromagnetic layer 39 includes a ferromagnetic body. For example, the ferromagnetic body is a metal selected from the group consisting of Cr, Mn, Co, Fe, and Ni; an alloy including one or more of these metals; an alloy including at least one or more elements of these metals, B, C, and N; or the like. For example, the ferromagnetic body is a Co—Fe, Co—Fe—B, Ni—Fe, or Co—Ho alloy, a Sm—Fe alloy, a Fe—Pt alloy, a Co—Pt alloy, or a CoCrPt alloy.

For example, in the first ferromagnetic layer 35, the product of the thickness and the saturation magnetization is 10 nmT or greater. For example, in the second ferromagnetic layer 37, the product of the thickness and the saturation magnetization is 10 nmT or greater. If the product of the thickness and the saturation magnetization of the ferromagnetic layer is 10 nmT or greater, the magnetization of the ferromagnetic layer is not magnetically inverted, and precession thereof is easily performed.

For example, the thickness of the first ferromagnetic layer 35 is 90% to 110% of the thickness of the second ferromagnetic layer 37. If the thickness of the first ferromagnetic layer 35 and the thickness of the second ferromagnetic layer 37 are substantially the same, timings of movement of the magnetization of the first ferromagnetic layer 35 and movement of the magnetization of the second ferromagnetic layer 37 are likely to coincide with each other, and thus the oscillation element 30 easily oscillates.

For example, the first non-magnetic layer 36 and the second non-magnetic layer 38 are non-magnetic conductive layers. For example, each of the first non-magnetic layer 36 and the second non-magnetic layer 38 is a metal of any one or an alloy containing any one selected from the group consisting of Cu, Au, Ag, Al, Ir, Ta, Ru, Pt, W, and Mo.

The non-magnetic conductive layer 33 is a flow channel for a drive current. The non-magnetic conductive layer 33 expands, for example, along the yz plane. The non-magnetic conductive layer 33 partially overlaps the first oscillation portion 31 when viewed in the x direction and expands to an outward side of the first oscillation portion 31. The non-magnetic conductive layer 33 partially overlaps the second oscillation portion 32 when viewed in the x direction and expands to an outward side of the second oscillation portion 32. The non-magnetic conductive layer 33 has, for example, a first region A1 which is positioned between the first ferromagnetic layer 35 and the second ferromagnetic layer 37 and a second region A2 which is not positioned between the first ferromagnetic layer 35 and the second ferromagnetic layer 37.

The non-magnetic conductive layer 33 is any one metal selected from or an alloy containing any one selected from the group consisting of Cu, Au, Ag, Al, Ir, Ta, Ru, Pt, W, and Mo.

For example, the thickness of the non-magnetic conductive layer 33 is 5 nm or larger. If the thickness of the non-magnetic conductive layer 33 is sufficiently large, a current easily flows along the non-magnetic conductive layer 33. The thickness of the non-magnetic conductive layer 33 is the thickness in the x direction.

Next, a writing operation with respect to the magnetic recording medium 100 using the magnetic recording head 1 will be described. The magnetic recording head 1 performs writing of data using the recording head 20. The recording head 20 performs microwave-assisted magnetic recording (MAMR) utilizing microwaves.

When data is written using the recording head 20, a writing current is applied to the coils 25 and 26, and a drive current is applied between the main magnetic pole 21 and the trailing shield 22 and the non-magnetic conductive layer 33. A drive current is a direct current. A value of the drive current may be constant or may vary.

First, application of a drive current will be described. A drive current flows in a first current path P1 connecting the main magnetic pole 21 and the non-magnetic conductive layer 33 to each other, and a second current path P2 connecting the write shield 23 and the non-magnetic conductive layer 33 to each other. In the first current path P1, for example, a drive current flows from the non-magnetic conductive layer 33 toward the main magnetic pole 21. In the second current path P2, for example, a drive current flows from the non-magnetic conductive layer 33 toward the write shield 23. In this case, as shown in FIGS. 4 and 6, in the first current path P1, a drive current flows from the non-magnetic conductive layer 33 toward the main magnetic pole 21 through the non-magnetic conductive layer 33, the first ferromagnetic layer 35, the first non-magnetic layer 36, and the main magnetic pole 21. In addition, in the second current path P2, a drive current flows from the non-magnetic conductive layer 33 toward the write shield 23 through the non-magnetic conductive layer 33, the second ferromagnetic layer 37, the second non-magnetic layer 38, the third ferromagnetic layer 39, and the write shield 23. In this case, the drive current is split from the non-magnetic conductive layer 33 to the first oscillation portion 31 and the second oscillation portion 32. Opposite to the direction of the drive current shown in FIGS. 4 and 6, in the first current path P1, a drive current may flow from the main magnetic pole 21 toward the non-magnetic conductive layer 33 through the main magnetic pole 21, the first non-magnetic layer 36, the first ferromagnetic layer 35, and the non-magnetic conductive layer 33, and in the second current path P2, a drive current may flow from the write shield 23 toward the non-magnetic conductive layer 33 through the write shield 23, the third ferromagnetic layer 39, the second non-magnetic layer 38, the second ferromagnetic layer 37, and the non-magnetic conductive layer 33. In this case, the drive current flows from the first oscillation portion 31 and the second oscillation portion 32 into the non-magnetic conductive layer 33. As shown in FIGS. 4 and 6, in the entire oscillation element 30, a direction of the drive current flowing through the first ferromagnetic layer 35 along the first current path P1 is opposite to a direction of the drive current flowing through the second ferromagnetic layer 37 along the second current path P2. For example, a drive current is supplied from the side shields 27 and 28 and the conductive layers 61 and 62 to the non-magnetic conductive layer 33. The main magnetic pole 21, the trailing shield 22, and the side shields 27 and 28 are connected to a drive power source.

The drive current which has flowed along the non-magnetic conductive layer 33 splits into the first oscillation portion 31 and the second oscillation portion 32. Alternatively, the drive current flowing through the first oscillation portion 31 and the second oscillation portion 32 flows into the non-magnetic conductive layer 33. The drive current flowing along the first current path P1 is spin-polarized using the magnetization of the main magnetic pole 21 and applies a spin transfer torque to the magnetization of the first ferromagnetic layer 35. The main magnetic pole 21 functions as a spin injection layer for the first ferromagnetic layer 35. The drive current flowing along the second current path P2 is spin-polarized using the magnetization of the third ferromagnetic layer 39 or the write shield 23 and applies a spin transfer torque to the magnetization of the second ferromagnetic layer 37. The third ferromagnetic layer 39 or the write shield 23 functions as a spin injection layer for the second ferromagnetic layer 37.

The magnetizations of the first ferromagnetic layer 35 and the magnetization of the second ferromagnetic layer 37 exhibit precession upon reception of a spin transfer torque. The magnetization precession in the first ferromagnetic layer 35 and the magnetization precession in the second ferromagnetic layer 37 cause oscillation of microwaves. A frequency of the magnetization precession in the first ferromagnetic layer 35 and a frequency of the magnetization precession in the second ferromagnetic layer 37 (an oscillation frequency of the microwave magnetic field oscillating from the first ferromagnetic layer 35 and an oscillation frequency of the microwave magnetic field oscillating from the second ferromagnetic layer 37) are, for example, 20 GHz to 40 GHz. Since the first ferromagnetic layer 35 and the second ferromagnetic layer 37 have a symmetrical positional relationship on the basis of the non-magnetic conductive layer 33, each of them stably performs oscillation of microwaves. More specifically, even when the drive current flowing through the non-magnetic conductive layer 33 is split to the first oscillation portion 31 and the second oscillation portion 32 and even when the drive current flowing through the first oscillation portion 31 and the second oscillation portion 32 flows into the non-magnetic conductive layer 33, microwaves stably oscillate from each of the first ferromagnetic layer 35 and the second ferromagnetic layer 37. This is because an arrangement order of the non-magnetic conductive layer 33, the ferromagnetic layer (first ferromagnetic layer 35), the non-magnetic layer (first non-magnetic layer 36), and the spin injection layer (main magnetic pole 21) in the direction of the drive current flow in the first current path P1 is the same as an arrangement order of the non-magnetic conductive layer 33, the ferromagnetic layer (second ferromagnetic layer 37), the non-magnetic layer (second non-magnetic layer 38), and the spin injection layer (third ferromagnetic layer 39 or write shield 23) in the direction of the drive current flow in the second current path P2.

In addition, if the first ferromagnetic layer 35 and the second ferromagnetic layer 37 have a symmetrical positional relationship on the basis of the non-magnetic conductive layer 33, the cycle of precession of the magnetization of the first ferromagnetic layer 35 and the cycle of precession of the magnetization of the second ferromagnetic layer 37 substantially coincide with each other. When the difference between the product of the thickness and the saturation magnetization of the first ferromagnetic layer 35 and the product of the thickness and the saturation magnetization of the second ferromagnetic layer 37 are within 10% of the average, the cycles of precession thereof are more likely to coincide with each other. A current value of the drive current flowing through the first current path P1 may be 90% or greater and 110% or less of a current value of the drive current flowing through the second current path P2 and may be the same as a current value of the drive current flowing through the second current path P2.

If the magnetization of the first ferromagnetic layer 35 and the magnetization of the second ferromagnetic layer 37 resonate, the oscillation element 30 performs oscillation of strong microwaves. Microwaves lead to the recording layer of the magnetic recording medium 100 and deteriorate stability of the magnetization of the recording layer.

In addition, if a writing current is applied to the coils 25 and 26, a magnetic flux is generated from the main magnetic pole 21. The magnetic flux generated from the main magnetic pole 21 leads to the recording layer of the magnetic recording medium 100 and causes inversion of the magnetization of the recording layer. If the magnetization of the recording layer of the magnetic recording medium 100 is inverted, data is written. Since stability of the magnetization of the recording layer has been deteriorated due to microwaves, the magnetization is likely to be inverted. That is, the magnetic recording head 1 has excellent writing efficiency.

As described above, in the magnetic recording head 1 according to the first embodiment, since the first ferromagnetic layer 35 and the second ferromagnetic layer 37 have a symmetrical positional relationship with respect to the non-magnetic conductive layer 33 to which a drive current is supplied, microwaves generated from the oscillation element 30 are made stable. The magnetic recording head 1 assists magnetization inversion of the magnetic recording medium 100 using microwaves. For this reason, if microwaves from the oscillation element 30 are made stable, data writing of the magnetic recording head 1 becomes stable. Stable data writing of the magnetic recording head 1 enhances reliability of the magnetic disk drive 300.

Thus far, a preferable aspect of the present invention has been described as an example on the basis of the first embodiment, but the present invention is not limited to the embodiment. The embodiment can be subjected to change within a range satisfying the gist of the present invention.

For example, in the first embodiment, real-MAMR using microwaves generated through precession of the magnetizations of the first ferromagnetic layer 35 and the second ferromagnetic layer 37 has been described as an example. However, the present invention is not limited to this example, and FC-MAMR may be adopted. FC-MAMR assists magnetization inversion of the magnetic recording medium 100 using a magnetic flux generated from the first ferromagnetic layer 35 and the second ferromagnetic layer 37 instead of microwaves generated from the first ferromagnetic layer 35 and the second ferromagnetic layer 37.

In real-MAMR, the magnetizations of the first ferromagnetic layer 35 and the second ferromagnetic layer 37 are subjected to precession using a drive current. On the contrary, in FC-MAMR, the magnetizations of the first ferromagnetic layer 35 and the second ferromagnetic layer 37 are inverted using a drive current. That is to say, in FC-MAMR, the oscillation element 30 is a magnetization reversal element, the first oscillation portion 31 is a first magnetization reversal portion, and the second oscillation portion 32 is a second magnetization reversal portion. The magnetization reversal element is an example of an element in the claims, the first magnetization reversal portion is an example of a first portion in the claims, and the second magnetization reversal portion is an example of a second portion in the claims. If the magnetizations of the first ferromagnetic layer 35 and the second ferromagnetic layer 37 are inverted, a magnetic flux generated from each of the first ferromagnetic layer 35 and the second ferromagnetic layer 37 changes. The magnetic flux generated from each of the first ferromagnetic layer 35 and the second ferromagnetic layer 37 leads to the recording layer of the magnetic recording medium 100 and deteriorates stability of the magnetization of the recording layer.

Even in the case of FC-MAMR, since the first ferromagnetic layer 35 and the second ferromagnetic layer 37 have a symmetrical positional relationship with respect to the non-magnetic conductive layer 33 to which a drive current is supplied, the reversal of magnetization occurring in the first ferromagnetic layer 35 and the second ferromagnetic layer 37 are made stable. More specifically, even when the drive current flowing through the non-magnetic conductive layer 33 is split to the first ferromagnetic layer 35 and the second ferromagnetic layer 37 and even when the drive current flowing through the first ferromagnetic layer 35 and the second ferromagnetic layer 37 flows into the non-magnetic conductive layer 33, the reversal of magnetization occurring in the first ferromagnetic layer 35 and the second ferromagnetic layer 37 is made stable. This is because an arrangement order of the non-magnetic conductive layer 33, the ferromagnetic layer (first ferromagnetic layer 35), the non-magnetic layer (first non-magnetic layer 36), and the spin injection layer (main magnetic pole 21) in the direction of the drive current flow in the first current path P1 is the same as an arrangement order of the non-magnetic conductive layer 33, the ferromagnetic layer (second ferromagnetic layer 37), the non-magnetic layer (second non-magnetic layer 38), and the spin injection layer (third ferromagnetic layer 39 or write shield 23) in the direction of the drive current flow in the second current path P2.

Figure 8:
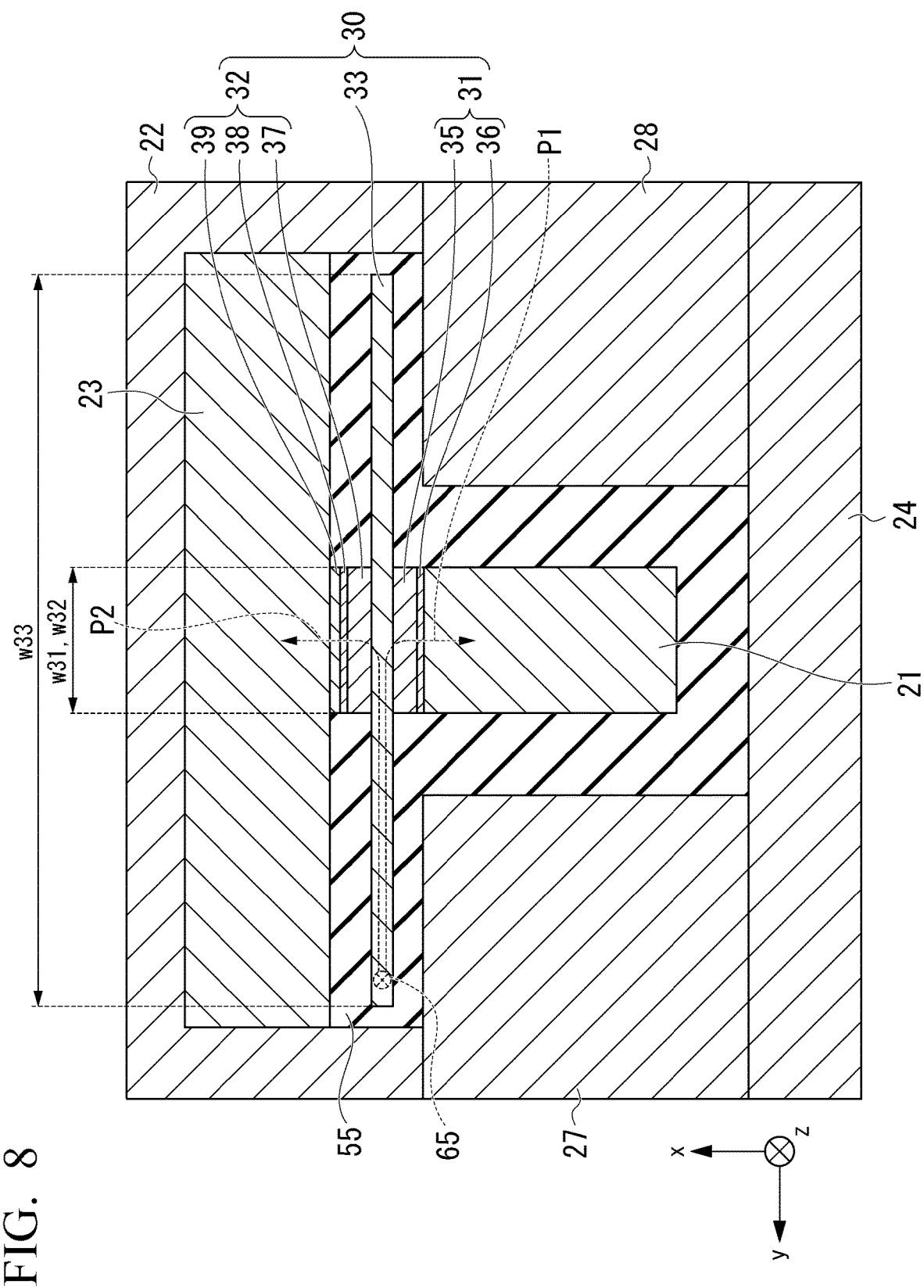
FIG. 8 is a plan view of a characteristic part of a magnetic recording head according to a first modification example when viewed from the air bearing surface side.

In addition, for example, FIG. 8 is a plan view of a characteristic part of a magnetic recording head according to a first modification example when viewed from the air bearing surface AS side. The magnetic recording head according to the first modification example differs from the magnetic recording head 1 according to the first embodiment in that the non-magnetic conductive layer 33 and the side shields 27 and 28 are not electrically connected to each other. In the first modification example, similar reference signs are applied to constitutions similar to those of the magnetic recording head 1 according to the first embodiment, and a description thereof will be omitted.

The trailing shield 22 is connected to the side shields 27 and 28. The trailing shield 22, the side shields 27 and 28, and the reading shield 24 surround the area around the main magnetic pole 21. An insulation layer 55 is provided in at least a portion between the trailing shield 22 and the side shields 27 and 28, and the reading shield 24 and the main magnetic pole 21.

For example, the non-magnetic conductive layer 33 is connected to a conductive layer 65 provided on a side in the direction of depth of this paper (z direction). For example, the conductive layer 65 includes a material similar to those of the conductive layers 61 and 62. The conductive layer 65 is connected to a drive power source. A drive current is supplied to the non-magnetic conductive layer 33 via the conductive layer 65. In FIG. 8, an example in which the conductive layer 65 is positioned in the z direction has been described, but the conductive layer 65 need only be electrically connected to the non-magnetic conductive layer 33.

It is also possible for the magnetic recording head according to the first modification example to achieve effects similar to those of the magnetic recording head 1 according to the first embodiment.

Figure 9:
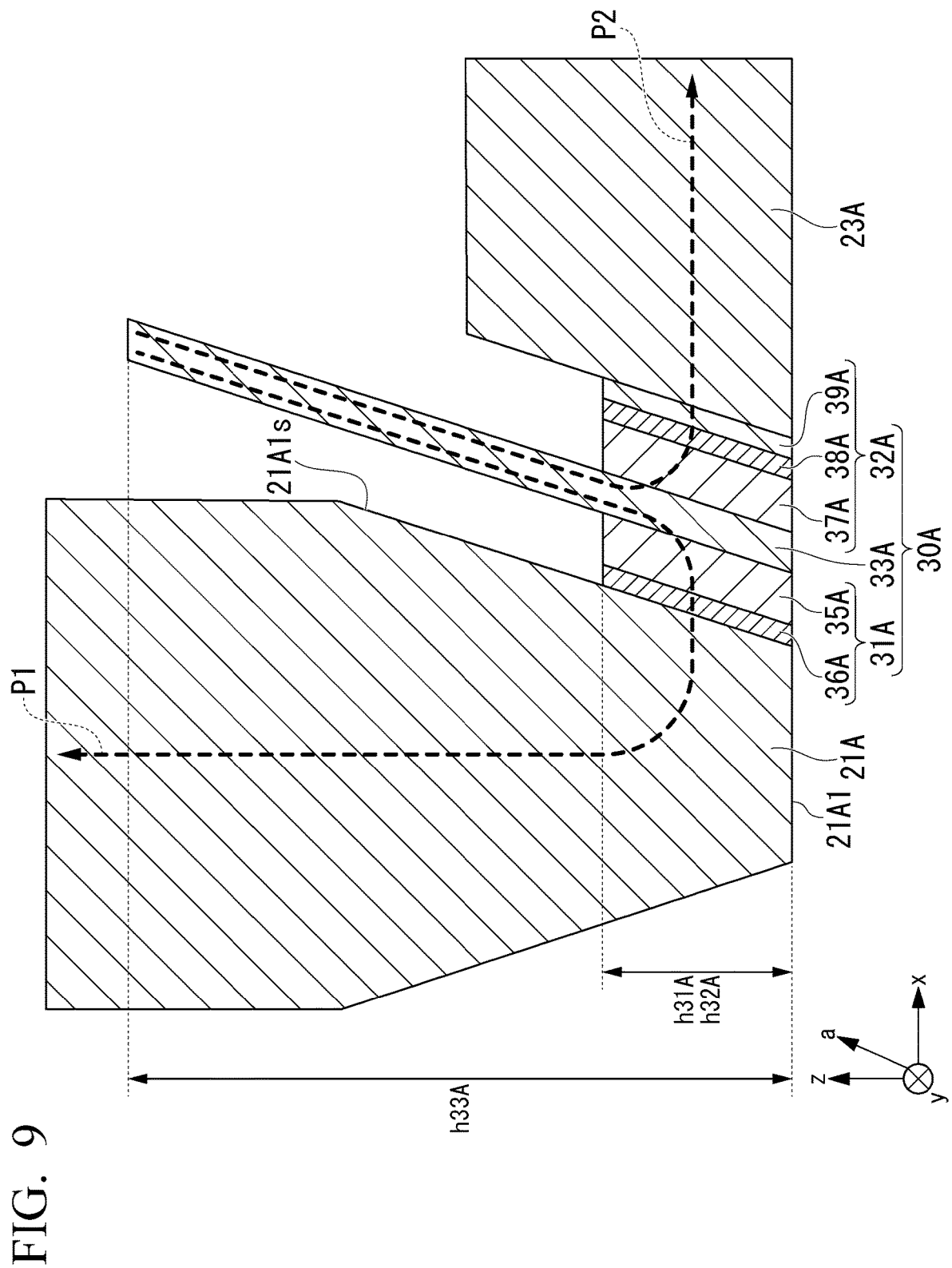
FIG. 9 is a cross-sectional view of a characteristic part of a magnetic recording head according to a second modified example.

Furthermore, for example, FIG. 9 is a cross-sectional view of a characteristic part of a magnetic recording head according to a second modified example. The magnetic recording head according to the second modified example has a main magnetic pole 21A, a write shield 23A, and an oscillation element 30A. The constituent elements of the second modified example that are the same as those of the magnetic recording head 1 according to the first embodiment will be denoted by the same reference symbols and description thereof will be omitted.

The main magnetic pole 21A is different from the main magnetic pole 21 according to the first embodiment in that a width of a tip portion of the main magnetic pole 21A including a first end 21A1 thereof in the x direction is made narrower as it approaches the air bearing surface AS. The description of the constituent element in the main magnetic pole 21A that are the same as those of the main magnetic pole 21 will be omitted. A lateral surface 21A1s of the tip portion including the first end 21A1 of the main magnetic pole 21A on the oscillation element 30A side is inclined with respect to the yz plane extending in the y and z directions.

The oscillation element 30A is in a write gap between the main magnetic pole 21A and the write shield 23A. The oscillation element 30A corresponds to the oscillation element 30 and the description of the same constitution will be omitted. The oscillation element 30A has a first oscillation portion 31A, a second oscillation portion 32A, and a non-magnetic conductive layer 33A. The first oscillation portion 31A corresponds to the first oscillation portion 30, the second oscillation portion 32A corresponds to the second oscillation portion 32, and the non-magnetic conductive layer 33A corresponds to the non-magnetic conductive layer 33. Also with regard to these, the description of the same constituent elements as those of the first embodiment will be omitted. The first oscillation portion 31A is between the main magnetic pole 21A and the non-magnetic conductive layer 33A. The second oscillation portion 32A is between the write shield 23A and the non-magnetic conductive layer 33A.

The first oscillation portion 31A has a first ferromagnetic layer 35A and a first non-magnetic layer 36A. The first non-magnetic layer 36A is between the first ferromagnetic layer 35A and the main magnetic pole 21A. The second oscillation portion 32A has a second ferromagnetic layer 37A, a second non-magnetic layer 38A, and a third ferromagnetic layer 39A. The second non-magnetic layer 38A is between the second ferromagnetic layer 37A and the write shield 23A. The third ferromagnetic layer 39A is between the second non-magnetic layer 38A and the write shield 23A. The third ferromagnetic layer 39A may be integrated with the write shield 23A.

Film surfaces of the first ferromagnetic layer 35A, the first non-magnetic layer 36A, the non-magnetic conductive layer 33A, the second ferromagnetic layer 37A, the second non-magnetic layer 38A, and the third ferromagnetic layer 39A are inclined with respect to the yz plane. The first ferromagnetic layer 35A, the first non-magnetic layer 36A, the non-magnetic conductive layer 33A, the second ferromagnetic layer 37A, the second non-magnetic layer 38A, and the third ferromagnetic layer 39A extend in the y direction and the a direction which is inclined with respect to the z direction. The a direction intersects the x, y, and z directions.

An area of a surface of the non-magnetic conductive layer 33A perpendicular to a thickness direction of the non-magnetic conductive layer 33A is larger than an area of a surface of the first ferromagnetic layer 35A perpendicular to a thickness direction of the first ferromagnetic layer 35A and is larger than an area of a surface of the second ferromagnetic layer 37A perpendicular to a thickness direction of the second ferromagnetic layer 37A. In the oscillation element 30A of the second modified example, these areas are areas of the ay plane in the y and a directions.

For example, a height h33A of the non-magnetic conductive layer 33A is higher than a height h31A of the first oscillation portion 31A and is higher than a height h32A of the second oscillation portion 32. The heights h31A, h32A, and h33A are heights in the z direction perpendicular to the air bearing surface AS.

The magnetic head according to the second modified example can also obtain the same effects as the magnetic recording head 1 according to the first embodiment.

Figure 10:
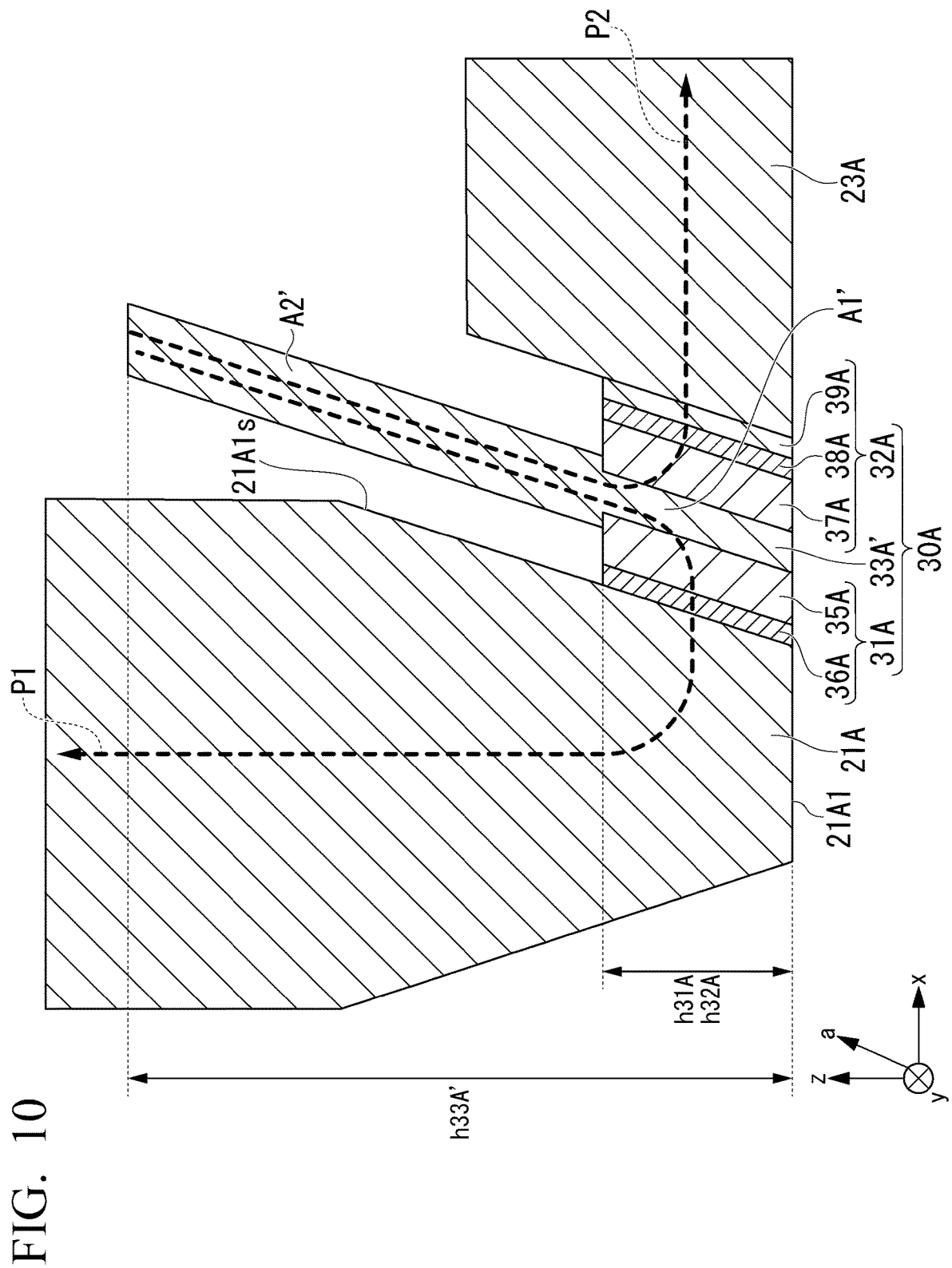
FIG. 10 is a cross-sectional view of a characteristic part of a magnetic recording head according to a third modified example.
Figure 11:
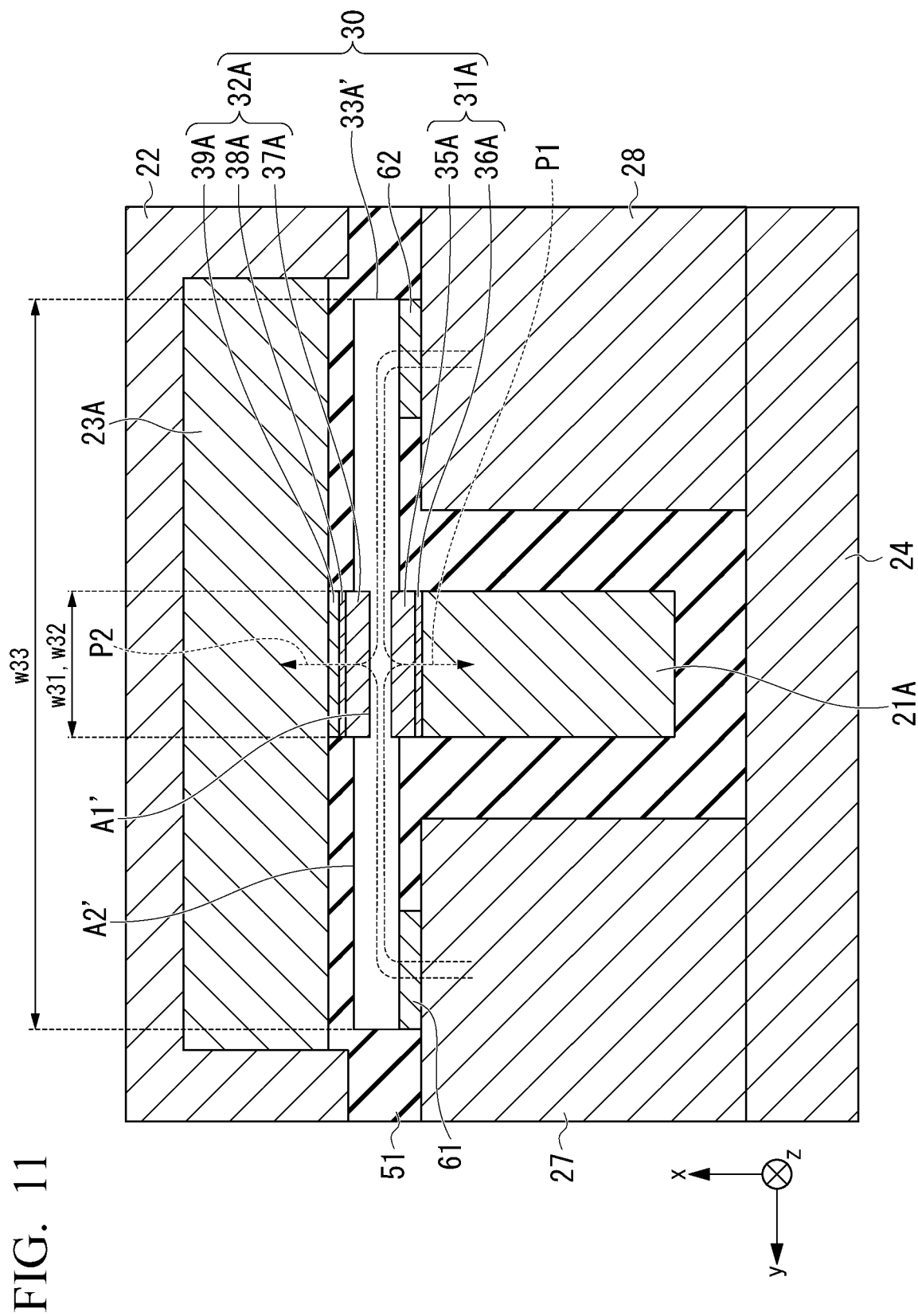
FIG. 11 is a plan view of the characteristic part of the magnetic recording head according to the third modified example when viewed from an air bearing surface side.

Furthermore, for example, FIG. 10 is a cross-sectional view of a characteristic part of a magnetic recording head according to a third modified example. FIG. 11 is a plan view of the characteristic part of the magnetic recording head according to the third modified example when viewed from the air bearing surface side. The constituent elements in the third modified example that are the same as those of the magnetic recording head according to the second modified example will be denoted by the same reference symbols and description thereof will be omitted.

A non-magnetic conductive layer 33A' corresponds to the non-magnetic conductive layer 33. The non-magnetic conductive layer 33A' has, for example, a first region A1' which is positioned between the first ferromagnetic layer 35A and the second ferromagnetic layer 37A and a second region A2' which is not positioned between the first ferromagnetic layer 35A and the second ferromagnetic layer 37A. The second region A2' is thicker than the first region A1'. Here, thicknesses of the second region A2' and the first region A1' are thicknesses in a direction perpendicular to the ay plane. If the thickness of the second region A2' is thicker than the thickness of the first region A1', a current density of a current flowing through the second region A2's can be reduced while shortening a write gap length between the main magnetic pole 21A and the write shield 23A. The shorter the write gap length, the higher a recording density. The magnetic recording head in which the current density of the current flowing through the second region A2' is low can prevent heat generation and the like and has high reliability.

Also, at least a part of a lateral surface of at least one of the first ferromagnetic layer 35A and the second ferromagnetic layer 37A is in contact with the non-magnetic conductive layer 33A'. If a contact area between the first ferromagnetic layer 35A and the non-magnetic conductive layer 33A' or a contact area between the second ferromagnetic layer 37A and the non-magnetic conductive layer 33A' is large, current densities at these contact surfaces can be reduced and a highly reliable magnetic recording head can be obtained.

EXPLANATION OF REFERENCES

1 Magnetic recording head
10 Reproduction head
11 Lower shield
12 Magneto-resistive effect element
13 Upper shield
20 Recording head
21 Main magnetic pole
21S Auxiliary magnetic pole
22 Trailing shield
23 Write shield
24 Reading shield
22a, 24a Coupling portion
22b, 24b Back gap
25, 26 Coil
27, 28 Side shield
30 Oscillation element
31 First oscillation portion
32 Second oscillation portion
33 Non-magnetic conductive layer
35 First ferromagnetic layer
36 First non-magnetic layer
37 Second ferromagnetic layer
38 Second non-magnetic layer
39 Third ferromagnetic layer
40 Slider substrate
50, 51, 55 Insulation layer
61, 62, 65 Conductive layer
100 Magnetic recording medium
200 Carriage assembly device
202 Spindle motor
212 Head gimbal assembly
213 Bearing shaft
214 Voice coil motor
220 Suspension
221 Load beam
222 Flexure
223 Base plate
224 Wiring
230 Control device
300 Magnetic disk drive
P1 First current path
P2 Second current path

What is claimed is:

1. A magnetic recording head comprising:
a main magnetic pole that extends toward an air bearing surface and generates a recording magnetic field;
a write shield disposed on a lateral side of the main magnetic pole when viewed from the air bearing surface; and
an element disposed in a gap between the main magnetic pole and the write shield, the element having:
a non-magnetic conductive layer;
a first portion disposed between the main magnetic pole and the non-magnetic conductive layer, the first portion including:
a first ferromagnetic layer; and
a first non-magnetic layer disposed between the first ferromagnetic layer and the main magnetic pole;
a second portion disposed between the write shield and the non-magnetic conductive layer, the second portion including:
a second ferromagnetic layer; and
a second non-magnetic layer disposed between the second ferromagnetic layer and the write shield;
a first current path connecting the main magnetic pole and the non-magnetic conductive layer to each other; and
a second current path connecting the write shield and the non-magnetic conductive layer to each other,
wherein in each of the first ferromagnetic layer and the second ferromagnetic layer, a product of a thickness and saturation magnetization is 10 nmT or greater, and
the non-magnetic conductive layer is disposed between the first portion and the second portion.

2. The magnetic recording head according to claim 1, wherein the non-magnetic conductive layer is a metal of any one or an alloy containing any one of Cu, Au, Ag, Al, Ir, Ta, Ru, Pt, W, and Mo.

3. The magnetic recording head according to claim 1, wherein a height of the non-magnetic conductive layer in a first direction orthogonal to the air bearing surface is larger than that of the first portion and that of the second portion in the first direction.

4. The magnetic recording head according to claim 1, wherein an area of a surface of the non-magnetic conductive layer perpendicular to a thickness direction of the non-magnetic conductive layer is larger than that of a surface of the first ferromagnetic layer perpendicular to a thickness direction of the first ferromagnetic layer and that of a surface of the second ferromagnetic layer perpendicular to a thickness direction of the second ferromagnetic layer.

5. The magnetic recording head according to claim 1, wherein a thickness of the non-magnetic conductive layer is 5 nm or larger.

6. The magnetic recording head according to claim 1, wherein a thickness of the first ferromagnetic layer is 90% to 110% of a thickness of the second ferromagnetic layer.

7. The magnetic recording head according to claim 1, wherein the non-magnetic conductive layer has a first region which is positioned between the first ferromagnetic layer and the second ferromagnetic layer and a second region which is not positioned between the first ferromagnetic layer and the second ferromagnetic layer, and
the second region is thicker than the first region.

8. The magnetic recording head according to claim 1, wherein at least a part of a lateral surface of at least one of the first ferromagnetic layer and the second ferromagnetic layer is in contact with the non-magnetic conductive layer.

9. The magnetic recording head according to claim 1, wherein the first ferromagnetic layer is configured so that magnetization precession occurs in the first ferromagnetic layer and the second ferromagnetic layer is configured so that magnetization precession occurs in the second ferromagnetic layer.

10. The magnetic recording head according to claim 9, wherein a frequency of the magnetization precession in the first ferromagnetic layer and a frequency of the magnetization precession in the second ferromagnetic layer are 20 GHz to 40 GHz.

11. A magnetic disk drive comprising:
the magnetic recording head according to claim 1; and
a magnetic recording medium that faces the air bearing surface.

12. A magnetic recording head comprising:
a main magnetic pole that extends toward an air bearing surface and generates a recording magnetic field;
a write shield disposed on a lateral side of the main magnetic pole when viewed from the air bearing surface; and
an element disposed in a gap between the main magnetic pole and the write shield, the element having:
a non-magnetic conductive layer;
a first portion disposed between the main magnetic pole and the non-magnetic conductive layer, the first portion including:
a first ferromagnetic layer; and
a first non-magnetic layer disposed between the first ferromagnetic layer and the main magnetic pole;
a second portion disposed between the write shield and the non-magnetic conductive layer, the second portion including:
a second ferromagnetic layer; and
a second non-magnetic layer disposed between the second ferromagnetic layer and the write shield;
a first current path connecting the main magnetic pole and the non-magnetic conductive layer to each other; and
a second current path connecting the write shield and the non-magnetic conductive layer to each other,
wherein the first ferromagnetic layer is configured so that magnetization precession occurs in the first ferromagnetic layer and the second ferromagnetic layer is configured so that magnetization precession occurs in the second ferromagnetic layer, and
the non-magnetic conductive layer is disposed between the first portion and the second portion.

13. The magnetic recording head according to claim 12, wherein the non-magnetic conductive layer has a first region which is positioned between the first ferromagnetic layer and the second ferromagnetic layer and a second region which is not positioned between the first ferromagnetic layer and the second ferromagnetic layer, and
the second region is thicker than the first region.

14. The magnetic recording head according to claim 12, wherein at least a part of a lateral surface of at least one of the first ferromagnetic layer and the second ferromagnetic layer is in contact with the non-magnetic conductive layer.

15. The magnetic recording head according to claim 12, wherein a frequency of the magnetization precession in the first ferromagnetic layer and a frequency of the magnetization precession in the second ferromagnetic layer are 20 GHz to 40 GHz.

16. A magnetic disk drive comprising:
the magnetic recording head according to claim 12; and
a magnetic recording medium that faces the air bearing surface.

* * * * *